(12) United States Patent
Frieder et al.

(10) Patent No.: US 6,904,428 B2
(45) Date of Patent: Jun. 7, 2005

(54) INTRANET MEDIATOR

(75) Inventors: Ophir Frieder, Chicago, IL (US); David Adam Grossman, Chicago, IL (US)

(73) Assignee: Illinois Institute of Technology, Chicago, IL (US)

(*) Notice: Subject to any disclaimer, the term of this patent is extended or adjusted under 35 U.S.C. 154(b) by 392 days.

(21) Appl. No.: 09/837,436

(22) Filed: Apr. 18, 2001

(65) Prior Publication Data

US 2002/0156771 A1 Oct. 24, 2002

(51) Int. Cl.[7] .............................................. G06F 7/00
(52) U.S. Cl. ................................................ 707/3; 707/9
(58) Field of Search ............................. 707/3, 5, 10, 2

(56) References Cited

U.S. PATENT DOCUMENTS

| | | | |
|---|---|---|---|
| 5,335,345 A | 8/1994 | Frieder et al. | |
| 5,495,605 A | 2/1996 | Cadot | |
| 5,546,576 A | 8/1996 | Cochrane et al. | |
| 5,574,900 A | 11/1996 | Huang et al. | |
| 5,600,831 A | 2/1997 | Levy et al. | |
| 5,768,578 A | 6/1998 | Kirk et al. | |
| 5,802,536 A * | 9/1998 | Yoshii et al. | 715/532 |
| 5,901,287 A * | 5/1999 | Bull et al. | 709/218 |
| 5,920,856 A * | 7/1999 | Syeda-Mahmood | 707/3 |
| 5,933,822 A | 8/1999 | Braden-Harder et al. | |
| 5,960,422 A * | 9/1999 | Prasad | 707/2 |
| 5,963,940 A * | 10/1999 | Liddy et al. | 707/5 |
| 5,970,490 A | 10/1999 | Morgenstern | |
| 5,987,454 A * | 11/1999 | Hobbs | 707/4 |
| 5,995,961 A | 11/1999 | Levy et al. | |
| 6,006,221 A * | 12/1999 | Liddy et al. | 707/5 |
| 6,067,552 A | 5/2000 | Yu | |
| 6,070,134 A | 5/2000 | Richardson et al. | |
| 6,076,088 A * | 6/2000 | Paik et al. | 707/5 |
| 6,078,914 A * | 6/2000 | Redfern | 707/3 |
| 6,078,924 A | 6/2000 | Ainsbury et al. | |
| 6,105,022 A | 8/2000 | Takahashi et al. | |
| 6,134,559 A | 10/2000 | Brumme et al. | |
| 6,145,003 A | 11/2000 | Sanu et al. | |
| 6,161,084 A | 12/2000 | Messerly et al. | |
| 6,167,370 A | 12/2000 | Tsourikov et al. | |
| 6,173,279 B1 * | 1/2001 | Levin et al. | 707/5 |
| 6,182,065 B1 | 1/2001 | Yeomans | |
| 6,263,342 B1 * | 7/2001 | Chang et al. | 707/103 R |
| 6,269,368 B1 * | 7/2001 | Diamond | 707/6 |
| 6,301,584 B1 * | 10/2001 | Ranger | 707/103 R |
| 6,304,864 B1 * | 10/2001 | Liddy et al. | 706/15 |
| 6,460,043 B1 * | 10/2002 | Tabbara et al. | 707/100 |
| 6,502,088 B1 * | 12/2002 | Gajda et al. | 707/2 |
| 6,523,022 B1 * | 2/2003 | Hobbs | 707/3 |
| 6,523,028 B1 * | 2/2003 | DiDomizio et al. | 707/5 |
| 6,567,812 B1 * | 5/2003 | Garrecht et al. | 707/100 |
| 6,625,617 B2 * | 9/2003 | Yarnall et al. | 707/104.1 |
| 6,633,867 B1 * | 10/2003 | Kraft et al. | 707/3 |
| 2001/0037328 A1 * | 11/2001 | Pustejovsky et al. | 707/3 |
| 2002/0111934 A1 * | 8/2002 | Narayan | 707/1 |
| 2002/0116176 A1 * | 8/2002 | Tsourikov et al. | 704/9 |
| 2003/0177111 A1 * | 9/2003 | Egendorf et al. | 707/3 |

* cited by examiner

*Primary Examiner*—Kim Vu
*Assistant Examiner*—Monplaisir Hamilton
(74) *Attorney, Agent, or Firm*—Pauley Petersen & Erickson

(57) ABSTRACT

An intranet mediator for obtaining direct answers to natural language questions allowing users to search both a data warehouse of integrated/structured data sources and unstructured data sources. The intranet mediator allows the user to obtain an answer to a natural language question without having to surf the data sources in which the answer might be contained, or without being limited to one specific factual item return. The intranet mediator operates on the supposition that most answers to business queries are contained within structured data sources which have been integrated into the data warehouse thereby having common schema and known contents. Preselection of the most relevant data source(s) is thus possible before query output. Search of unstructured data is also performed for additional context surrounding either the question or the answer. A direct answer is given in response to the question. If desired, the intranet mediator may also display a list of data sources where additional relevant information may be found.

21 Claims, 1 Drawing Sheet

INTRANET MEDIATOR

BACKGROUND OF THE INVENTION

1. Field of the Invention

The present invention relates to a system whereby a direct answer may be given to a specific natural language query through a convenient search of structured and unstructured data sources.

2. Discussion of the Related Art

There are two types of digital data gathering commonly in use. One, information retrieval, is concerned with the retrieval of information from unstructured data sources, such as text documents, where each element of the data is not individually defined. The user will enter "search terms" as a data query and the unstructured data will be searched for occurrence of these terms. Results of such a search may return the text, i.e., the data, or may, e.g., in a World Wide Web search, only return the location, or site, of the data. The user would then need to read the text or go to each site and locate the occurrence of the search term, which may, or may not, be relevant to an actual question which the user wants answered. This time consuming practice is commonly known as "surfing".

Information retrieval is thus not geared to efficiently provide a specific answer to a specific question. Attempts to alleviate this problem were the subject of U.S. Pat. No. 6,167,370 to Tsourikov et al., which suggests giving a summary of text findings as a response to a user query. But, for example, when a user wants to know "What are the three best Sushi restaurants in Chicago?" the user does not necessarily care to browse through text summaries, or restaurant guide web sites, which are the likely search results of a known information retrieval search. The surfing in this context may be particularly tedious if the query is submitted to the data sources as an equally weighted string of tokens. For example, where "Chicago" is equally weighted with "Sushi" when figured into the search results, a user may wade through scores of restaurant web sites having nothing to do with Sushi eateries. Avoidance of this problem may require the user to know Boolean logic or other specific search strategy formats, and individually structure each search. The user would most often prefer just a list of three Sushi restaurants in Chicago in response to this natural language question.

The second type of digital data gathering commonly in use is the structured data source search, where highly structured data within one specific data source, usually privately owned and accessed, are searched to return a specific answer. In the past, the data sources were required to be searched one data source at a time. Integration of their individual data sources is generally performed by private business to enable answers to queries whose answers require more than one factual component. This integration is expensive and can remain underutilized for reasons such as an arcane nature of query formulation or because extensive data source knowledge may be required of the user to make a rational search selection. That is, the user may need to know where to look and how to look to expect a relevant answer. Concurrent searching of unintegrated structured data sources, and merging of their results, to solve some of these problems, was the subject of U.S. Pat. No. 5,995,961 to Levy, et al.

Further, additional information, beyond the specific factual components of a query, cannot be provided from the results of a data source search. For example, assume that the data source user, or searcher, wishes to know the building on the I.I.T. campus with the largest number of rooms. The user cannot expect a picture of the building, or a link to a picture of the building, returned with the search results, even though the user might wish to see such a picture.

U.S. Pat. No. 6,078,924 to Ainsbury et al. illustrates a technique of digital data gathering. According to this patent, the user is allowed to aggregate data found in the user's previous searches on a specific topic into a central file. This central file can then be controlled from a commercial desktop computer application to facilitate searching of the data.

What is needed in the art is a system whereby the user can take advantage of both information retrieval and structured data types of digital data gathering concurrently to provide a direct answer to a specific question, and preferably provide further context for that answer. It is also desirable that the query be accepted in a natural language format whereby the user needs no special skills in query formulation. It is further desirable that the query be intelligently parsed so as to weight the relevant parts of the query and that synonyms of the natural language query be provided to give a more thorough search and accurate answer. It is further desirable that the answers, and any related information, be limited in number to only that required or most relevant to the query.

DEFINITIONS

"Query" refers herein to any form of searchable subject matter, and may include query tokens, or elements of a total query, whether aggregate or separate, unless otherwise limited or defined by the context of the disclosure.

"Data" refers herein to any form of digitally stored information, unless otherwise limited or defined by the context of the disclosure.

"Concurrent" means within the time frame between question output and answer display and does not necessarily imply that searches happen simultaneously.

"Direct answer" and "most likely answer" are used interchangeably herein and refer to the best available answer, whether factually based, referencing additional data, or refusal to answer, based upon the results of the data retrieved by the searches of the intranet mediator.

"Common schema" means an organizational definition of structured data shared by multiple data sources.

"Data source" means a logically, independently operating data storage, search, retrieval, and manipulation system. The system may store data of any digital form.

SUMMARY OF THE INVENTION

The intranet mediator of the present invention obtains for the user a direct, or most likely, answer to a natural language question. The intranet mediator provides the user with a search of both structured data sources and a repository of unstructured data sources. The structured data sources will preferably be aggregated into a physical data warehouse to provide for ease of searching a rapid attainment of search results. The data warehouse was previously constructed, e.g., by the corporate owner thereof, to integrate and abstract its collections of structured data sources with common schema, thereby providing meta-data for the data warehouse. The meta-data will give a global overview of the structured data sources thus making the warehouse easily searchable. The unstructured data sources may be data such as internal video, audio, or document files stored within the private databases of the owner, or they may be public sources, e.g., collections of documents available via the worldwide web or the like, or both. The unstructured data sources may be provided with a meta-data repository also.

The intranet mediator allows the user to input, and obtain an answer to, a natural language question without having to read text or surf the data sources in which the answer might be contained, or without being limited to one specific factual item return. The intranet mediator operates in part on the supposition that most answers to a businessperson's questions are contained within privately owned structured data sources of the business that were already integrated into a data warehouse. Selection of the most relevant data sources prior to searching is therefore possible. The direct answer selection to the user's question is accordingly weighted to the search response from these structured data sources. Searching of the unstructured data sources may be performed automatically, or upon determination that answers are not likely from the structured data sources, or if additional context surrounding either the query or the answer is justified or desired. A direct, or most likely, answer is then given to the user in response to the input question. If desired, the intranet mediator may also display a list of related data or data sources where additional information relevant to the user's question may be found.

The intranet mediator desirably includes the logical functionality of a natural language question input module; a parser module for assembling a search query from the natural language question; a query expander module; an unstructured data source manager operably connected to at least one unstructured data source; a data source selection module operably connected to a meta-data repository; a dispatcher module interfacing between the data source selection module and both a structured data source manager and the unstructured data source manager, the structured data source manager being operably connected to a data warehouse; a results manager module operably connected to both of the data source managers; and an answer output module.

Discussion of the modules will be given herein with respect to specific functional tasks or task groupings that are in some cases arbitrarily assigned to the specific modules for explanatory purposes. It will be appreciated by the person having ordinary skill in the art that an intranet mediator according to the present invention may be arranged in a variety of ways, or that functional tasks may be grouped according to other nomenclature or architecture than is used herein without doing violence to the spirit of the present invention.

DETAILED DESCRIPTION OF THE PREFERRED EMBODIMENT

Figure 1:
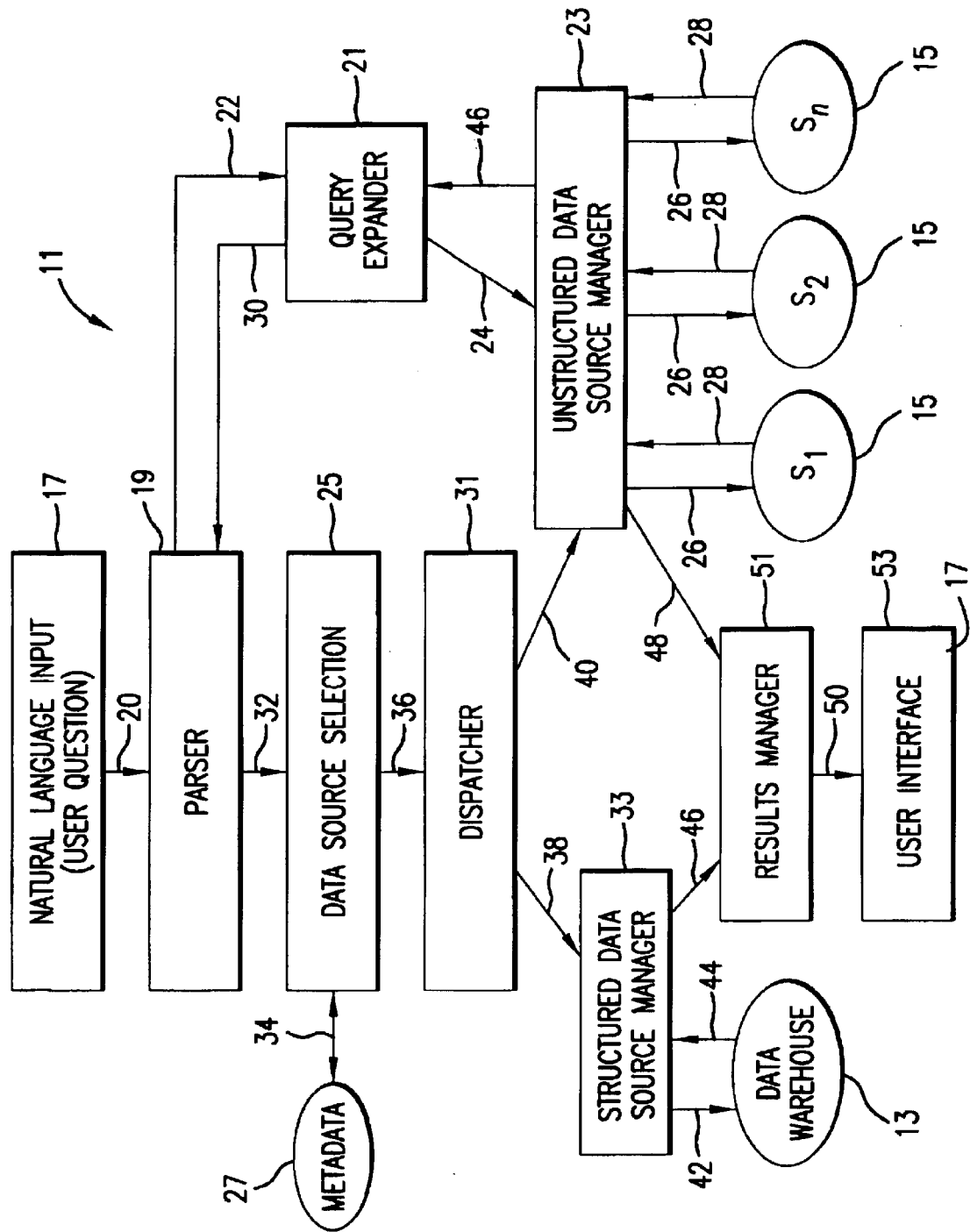
FIG. 1 is a block diagram representing the architecture of an intranet mediator according to one embodiment of the current invention.

Referencing the block diagram of FIG. 1, the preferred embodiment of an intranet mediator 11 according to the present invention comprises means for the searching of both structured data sources, such as a multiplicity of databases integrated into a data warehouse 13, and unstructured data sources, collectively 15, to arrive at a direct answer to a natural language question input by the user.

A user interface 17, such as a known graphical user interface, accepts input of a user question in natural language format and may allow the user to manually select data sources if desired. As indicated by the two boxes in FIG. 1 labeled 17, the user interface 17 is preferably a part of an input/output user interface which is also tasked with displaying an answer to the user question.

A parser module 19 then accepts the natural language question input by the user, as at line 20, parsing and assembling the relevant concepts of the natural language question into a query, or queries, of weighted search tokens, hereinafter referred to simply as a query, and also eliminating the irrelevant, or non-indicative, words of the natural language question from use as search tokens. For example, in the query: "What are the three best Sushi restaurants in Chicago?", words irrelevant to data retrieval such as "are" and "the" may be eliminated from use as tokens by the parser module. Various techniques such as grammar matching, lattices, partial lattices, etc. for accomplishing the tasks of the parser module 19 are available and considered within the skill of the person having ordinary skill in the art.

A query expander module 21 is operably connected to the parser module 19, as at line 22, for receiving the parsed query tokens and obtaining additional terms synonymous or analogous to the tokens and expanding the query with additional tokens if desirable to expand the chance of a return of information relevant to the query. Various techniques such as thesauri, dictionaries, term expansion, stemming, phrase generation, and the like are available to accomplish this query, or token, expansion and are considered within the skill of the person having ordinary skill in the art.

The query expander module 21 then passes the tokens, preferably including the expanded tokens, to an unstructured data source manager 23, as at line 24, for a limited use specialty search to acquire additional synonyms, or terms analogous to, the query tokens and expanded query tokens, if any. The unstructured data source manager 23 initiates a search, as at lines 26, of one or more repositories of unstructured data sources 15, hereinafter referred to in the singular for ease of explanation, and obtains the search results therefrom, as at lines 28, with any acceptable method of information retrieval. Additional tokens, if any, may be filtered from the results of the unstructured data source search returned to the query expander module 21 from unstructured data source manager 23 via line 46 and added to the expanded query for return to the parser module 19 through the query expander module 21, as at line 30. The unstructured data repository 15, or an operable link to such a repository, may also be considered as a part of the intranet mediator 11 according to certain embodiments of the present invention. Unstructured data sources may include private or public data repositories, e.g., a private video archive and the World Wide Web, respectively.

The parser module 19 will then pass the expanded query to the data source selection module 25, as at line 32. The data source selection module 25 determines the most likely data source to contain an answer for each token of the expanded query; e.g., adaptive, heuristic, hard-coded, user-directed, standard, handwritten, or data-mined inquiry techniques through its connection, as at line 34, to a meta-data repository 27 abstracting the contents of a data warehouse 13 of structured data sources. Meta-data for the unstructured data repository 15 may further be contained in the meta-data repository 27 in certain embodiments of the present invention. The meta-data repository, or an operable link to such a repository, may also be considered as a part of the intranet mediator according to certain embodiments of the present invention.

Upon selection of the appropriately likely data sources to return an answer for each token of the expanded query, the data source selection module 25 will pass the data source selections and accompanying search tokens onto the dispatcher module 31, as at line 36. The dispatcher module 31 will then route each token to be searched to the appropriate data source manager 33, 23. Routing will commonly occur via an intranet although other networks including the internet or simply direct routing are also within the scope of this invention, as at line 38 to the structured data source manager 33 or to the unstructured data source manager 23 via line 40. The structured data source manager 33 and the unstructured data source manager 23 will then interface most efficiently with the data warehouse or each database, via lines 42 and 26, respectively, according to the individual requirements of the data sources. The data warehouse 13 is a physical data warehouse of integrated and structured private data sources and may be constructed according to known techniques such as extraction/transform/load (ETL) techniques. One of ordinary skill in the art will recognize that other data warehouse development techniques are likewise within the scope of this invention. The data warehouse 13, or an operable link to such a warehouse, may also be considered a part of the intranet mediator 11 according to some embodiments of the present invention.

Search results are returned to the structured and unstructured data source managers, 33, 23 respectively, via lines 44, 28, respectively, for additional processing if any, and then forwarded via lines 46, 48 respectively to the results manager module 51.

The results manager module 51 desirably accepts and consolidates the results of the structured and unstructured data source searches for each search token and integrates the results of the searches. Duplicate results are also eliminated as appropriate. The results manager module 51 then weights or ranks the results and at least one most likely answer is selected. In the presently preferred embodiment, if an answer is returned from the structured data source, for example, the data warehouse, it is published as the most likely answer. It will be understood that selection of the direct answer from the unstructured data source is within the scope of this invention. In the described embodiment, the associated data links, extracted text, or the like, from the unstructured data source search may be further selected and ranked. An answer module portion 53 of the user interface 17 may then receive answer data via line 50 and may then perform any formatting necessary for the display via the user interface 17, of the most likely answer and, if desired, the associated data or data links available as additional context for the direct answer.

The user interface 17 of the described embodiment will wait for some specified time interval or specified number of results to accumulate and then display the currently ranked results. The user interface 17 will further continue receiving results and ranking them in conjunction with the total accumulated results to capture answers which may have been delayed for various reasons. The user is then preferably presented with an option to activate a "get next" display command, and the now possibly revised rankings or additionally aggregated results are displayed.

Having thus described an intranet mediator for searching both structured and unstructured data sources for arriving at a most likely answer to a natural language question input by the user; it will be appreciated that many variations thereon will occur to the artisan upon an understanding of the present invention, which is therefore to be limited only by the appended claims.

We claim:

1. A method of digital data gathering for providing a direct answer to a natural language question, comprising:

a) accepting input of a natural language question;

b) identifying the relevant concepts of the natural language question;

c) assembling the relevant concepts of the natural language question into a query d) identifying, via a meta-data source for a physical data warehouse, a data source in the physical data warehouse likely to contain an answer to the query;

e) performing a first search of the query in the physical data warehouse;

f) performing a second search of the query in an unstructured data source not contained in the physical data warehouse;

g) integrating the results of the first and second searches and selecting a direct answer to the natural language question; and h) displaying the direct answer to the natural language question.

2. The method of digital data gathering for providing an answer to a natural language question, according to claim 1, further comprising: eliminating redundant search results and ranking search results in order of relevance.

3. The method of digital data gathering for providing an answer to a natural language question, according to claim 1, further comprising:

routing the query and identified data source to a structured data source manager.

4. The method of digital data gathering for providing an answer to a natural language question, according to claim 1, further comprising:

eliminating irrelevant words of the natural language question from use in the query.

5. The method of digital data gathering for providing an answer to a natural language question, according to claim 1, further comprising:

routing the query to an unstructured data source manager for performing the second search.

6. The method of digital data gathering for providing an answer to a natural language question, according to claim 1, further comprising:

displaying data related to the direct answer.

7. The method of digital data gathering for providing an answer to a natural language question, according to claim 1, further comprising:

accumulating search results for a specified time before displaying the direct answer.

8. The method of digital data gathering for providing an answer to a natural language question, according to claim 1, further comprising:

accumulating additional search results after displaying the direct answer.

9. The method of digital data gathering for providing an answer to a natural language question, according to claim 8, further comprising: updating the ranking of the search results by incorporating the additional search results.

10. The method of digital data gathering for providing an answer to a natural language question, according to claim 9, further comprising:

providing a second display updating the ranking of the search results by incorporating the additional search results.

11. The method of digital data gathering for providing an answer to a natural language question, according to claim 10, wherein: the second display updating the ranking of the search results is manually actuated.

12. An intranet mediator for providing a direct answer to a natural language question, comprising:
   a) a user interface with:
      i) a natural language question input module for accepting natural language questions; and
      ii) an answer module for display of the direct answer;
   b) a parser module for identifying the relevant concepts of the natural language question, assembling the relevant concepts of the natural language question into a query and eliminating irrelevant words of the natural language question from use in the query;
   c) an unstructured data source manager for managing query input to, and accepting results from, unstructured data sources outside of a physical data warehouse;
   d) a data source selection module for accepting the query from the parser and for identifying a data source likely to contain an answer to the query; the data source selection module being connectable to a meta-data source for a physical data warehouse;
   e) a dispatcher module for accepting the query from the parser and for accepting the identified data source from the data source selection module and routing the query and identified data source to a physical data warehouse data source manager or the unstructured data source manager, or both;
   f) the physical data warehouse data source manager being for accepting the query from the dispatcher and performing a search of the query in the physical data warehouse and forwarding the results of the search to a results manager module;
   g) the unstructured data source manager further accepting the query and any identified unstructured data sources from the dispatcher and performing a search of the query in the identified unstructured data sources outside of the physical data warehouse and forwarding the results of the search to a results manager; and
   h) a results manager module for accepting the results of the structured and unstructured data source searches and integrating the results of the searches and selecting the direct answer and forwarding the direct answer to the answer module.

13. The intranet mediator according to claim 12, further comprising: the natural language question input module being constructed and arranged for allowing the user to manually select data sources if desired.

14. The intranet mediator according to claim 12, further comprising; the answer module being constructed and arranged for display of the direct answer and data associated therewith.

15. In the intranet mediator according to claim 14, the results manager module further comprising: means for accumulating search results for a specified time or specified number of results before displaying the direct answer.

16. In the intranet mediator according to claim 14, the results manager module further comprising: means for accumulating additional search results after displaying the direct answer.

17. In the intranet mediator according to claim 16, the results manager module further comprising: means for updating the ranking of the search results by incorporating the additional search results.

18. In the intranet mediator according to claim 17, the answer module further comprising: means for providing a second display updating the ranking of the search results by incorporating the additional search results.

19. In the intranet mediator according to claim 18, further comprising: means for manually actuating the second display.

20. An intranet mediator for providing a direct answer to a natural language question, comprising:
   a) a physical data warehouse containing structured data sources;
   b) unstructured data sources outside of the physical data warehouse;
   c) a meta-data repository having meta-data for the structured data sources;
   d) a natural language question input module for accepting natural language queries and allowing the user to manually select data sources if desired;
   e) a parser module for identifying the relevant concepts of the natural language question, assembling the relevant concepts of the natural language question into primary query tokens and eliminating irrelevant words of the natural language question from use as primary query tokens, and for accepting results from a query expander module;
   f) a query expander module for accepting the primary query, determining analogous terms to the primary query tokens, and forwarding the primary query tokens and the analogous terms to an unstructured data source manager, and assembling enhanced query tokens from the results;
   g) an unstructured data source manager for managing enhanced query token input to, and accepting search results from, the unstructured data sources outside of the physical data warehouse;
   h) a data source selection module for accepting the enhanced query from the parser module and connectable to the meta-data source for the physical data warehouse, and for identifying a data source likely to contain an answer to each of the enhanced query tokens;
   i) a dispatcher module for accepting the enhanced query tokens from the parser and for accepting the identified data sources from the data source selection module and routing the enhanced query tokens and identified data sources to a structured data source manager and an unstructured data source manager;
   j) a structured source manager for accepting the enhanced query tokens and the identified structured data sources from the dispatcher and performing a search of the enhanced query tokens in the identified structured sources and forwarding the results of the search to a results manager module;
   k) the unstructured source manager further accepting the enhanced query tokens and identified unstructured data sources from the dispatcher and performing a search of the enhanced query tokens in the identified unstructured data sources and forwarding the results of the search to a results manager;
   l) a results manager module for accepting the results of the structured and unstructured data source searches for each enhanced query token and integrating the results of the searches and selecting a direct answer to the natural language question and forwarding the direct answer to the answer module; and
   m) an answer module for display of the direct answer and associated data links.

21. The intranet mediator according to claim 20, further comprising: the meta-data repository having meta-data for unstructured data sources within the physical data warehouse.

* * * * *